United States Patent
Wang et al.

(10) Patent No.: US 12,266,919 B2
(45) Date of Patent: Apr. 1, 2025

(54) METHOD FOR ADAPTIVELY ADJUSTING PWM DUTY CYCLE, CIRCUIT AND MOTOR DRIVING SYSTEM

(71) Applicant: CRM ICBG (WUXI) CO., LTD., Wuxi (CN)

(72) Inventors: Sang Wang, Wuxi (CN); Xudong Zhao, Wuxi (CN); Zhengrui Zhang, Wuxi (CN)

(73) Assignee: CRM ICBG ( wuxi ) Co., ltd., Jiangsu (CN)

( * ) Notice: Subject to any disclaimer, the term of this patent is extended or adjusted under 35 U.S.C. 154(b) by 0 days.

(21) Appl. No.: 18/699,318

(22) PCT Filed: Jul. 29, 2022

(86) PCT No.: PCT/CN2022/108942
§ 371 (c)(1),
(2) Date: Apr. 8, 2024

(87) PCT Pub. No.: WO2023/071344
PCT Pub. Date: May 4, 2023

(65) Prior Publication Data
US 2024/0332951 A1    Oct. 3, 2024

(30) Foreign Application Priority Data
Nov. 1, 2021 (CN) .......................... 202111282951.9

(51) Int. Cl.
*H02H 7/09* (2006.01)
*H02H 3/24* (2006.01)
(Continued)

(52) U.S. Cl.
CPC ............. *H02H 7/09* (2013.01); *H02H 3/243* (2013.01); *H02H 7/0833* (2013.01); *H02P 6/28* (2016.02);
(Continued)

(58) Field of Classification Search
CPC ........ H02H 7/09; H02H 3/243; H02H 7/0833; H02P 6/28; H02P 27/08; H02P 2205/01;
(Continued)

(56) References Cited

U.S. PATENT DOCUMENTS 6,801,009 B2 * 10/2004 Makaran ................. H02P 29/02
388/903
2016/0008961 A1 * 1/2016 Takano ............... B25B 23/1475
173/2

(Continued)

FOREIGN PATENT DOCUMENTS

CN 103904897 A 7/2014
CN 106602970 A 4/2017
(Continued)

*Primary Examiner* — Bickey Dhakal
(74) *Attorney, Agent, or Firm* — IPRTOP LLC

(57) ABSTRACT

The present application relates to a method, circuit, and motor driving system for adaptively adjusting a PWM duty cycle, comprising: sampling a direct current bus voltage and performing a low-pass filtering; determining whether the direct current bus voltage is under-voltage; if yes, entering an under-voltage protection state; and if not, executing the next step; calculating a new duty cycle and a new amplitude; determining whether the new duty cycle is greater than 100%; if yes, applying a weak magnetic control; and if not, adjusting a duty cycle of PWM signals through the new amplitude. Without altering the core current loop, torque loop, or speed loop of the motor driving system, this application adaptively adjusts the PWM duty cycle based on existing sine wave generators and PWM generators, effectively mitigating the impact of direct current bus voltage fluctuations on motor performance, ensuring straightforward operation, and significantly reducing costs.

15 Claims, 3 Drawing Sheets

(51) Int. Cl.
    *H02H 7/08*     (2006.01)
    *H02P 6/28*     (2016.01)
    *H02P 27/08*    (2006.01)

(52) U.S. Cl.
    CPC .......... *H02P 27/08* (2013.01); *H02P 2205/01* (2013.01); *H02P 2205/05* (2013.01); *H02P 2205/07* (2013.01); *H02P 2209/11* (2013.01)

(58) Field of Classification Search
    CPC ............. H02P 2205/05; H02P 2205/07; H02P 2209/11
    See application file for complete search history.

(56) References Cited

U.S. PATENT DOCUMENTS

| | | | | |
|---|---|---|---|---|
| 2016/0111984 A1* | 4/2016 | Koizumi | .................. | H02P 6/28 318/400.22 |
| 2017/0070168 A1* | 3/2017 | Takano | ..................... | B25F 5/00 |
| 2023/0135870 A1* | 5/2023 | Huang | ................... | H02P 25/03 318/729 |

FOREIGN PATENT DOCUMENTS

| | | | | |
|---|---|---|---|---|
| CN | 113193792 A | | 7/2021 | |
| GB | 2508117 A | * | 5/2014 | ............... A47L 5/24 |
| JP | 2005094925 A | | 4/2005 | |
| WO | 2021174737 A | | 9/2021 | |

\* cited by examiner

METHOD FOR ADAPTIVELY ADJUSTING PWM DUTY CYCLE, CIRCUIT AND MOTOR DRIVING SYSTEM

FIELD OF THE INVENTION

The present application relates to the field of motor driving, and in particular, to a method, circuit, and motor driving system for adaptively adjusting a Pulse Width Modulation (PWM) duty cycle.

BACKGROUND OF THE INVENTION

The use of permanent magnet synchronous motors (PMSMs) is widespread in household appliances and power tools. However, abrupt voltage fluctuations in the electrical grid can result in significant variations in the direct current (DC) bus voltage when the hardware circuit lacks sufficient capacitance, impacting the motor's overall performance. Related solutions tackle the issue of bus voltage fluctuations through both software and hardware strategies. Software strategies often involve complex damping control techniques, necessitating additional power loops and posing challenges during debugging. These software strategies also incur substantial computational overhead. In contrast, hardware strategies frequently rely on voltage boost mechanisms to mitigate bus voltage fluctuations, but they require additional peripheral circuits, and improper control may lead to over-voltage (that is, the bus voltage must not exceed the ideal bus voltage), further escalating circuit costs.

As a result, finding ways to manage bus voltage fluctuations while addressing cost and implementation challenges remains a critical concern for professionals in this field.

SUMMARY OF THE INVENTION

In view of the above-mentioned disadvantages of the related technology, the present application aims to provide a method for adaptively adjusting a Pulse Width Modulation (PWM) duty cycle, a circuit, and a motor driving system for solving the problems of high cost, difficulty in implementation, etc.

The method for adaptively adjusting the PWM duty cycle, for the motor driving system, comprises:
1) sampling a direct current bus voltage to obtain sample signals of the direct current bus voltage, and performing a low-pass filtering on the sample signals to obtain low-pass filtered signals;
2) determining whether the direct current bus voltage is under-voltage based on the low-pass filtered signals; if yes, entering an under-voltage protection state; and if not, executing step 3);
3) calculating a new duty cycle D' and a new amplitude corresponding to the new duty cycle D', wherein the new duty cycle D' satisfies: D'=D*A/B, wherein D denotes a duty cycle obtained from a control loop of the motor driving system, A denotes a previous sample signal of the direct current bus voltage, and B denotes a current sample signal of the direct current bus voltage; and
4) determining whether the new duty cycle D' is greater than 100%; if yes, applying a weak magnetic control; and if not, setting an amplitude of a carrier for generating PWM signals as the new amplitude, so as to adjust a duty cycle of the PWM signals through the new amplitude.

Optionally, power devices are turned off when the direct current bus voltage is under-voltage.

Optionally, during the weak magnetic control, the amplitude of the carrier is first set to a maximum value, and then phases of the PWM signals are changed by adjusting a phase of the carrier.

Optionally, the control loop comprises a current loop, torque loop, or speed loop.

Optionally, the carrier comprises a sine wave, saddle wave, or square wave.

To achieve the above and other related purposes, the present application provides a circuit for adaptively adjusting the PWM duty cycle, for the motor driving system, comprising:
 a sampling module, configured to receive a direct current bus voltage and sample the direct current bus voltage, so as to obtain sample signals of the direct current bus voltage;
 a digital filtering module, connected to an output end of the sampling module, and configured to perform a low-pass filtering on the sample signals to obtain low-pass filtered signals;
 an under-voltage determination module, connected to an output end of the digital filtering module, and configured to determine whether the direct current bus voltage is under-voltage based on the low-pass filtered signals;
 a duty cycle calculation module, connected to the output end of the sampling module and an output end of the under-voltage determination module, and configured to calculate a new duty cycle D' and a new amplitude corresponding to the new duty cycle D' when the direct current bus voltage is not under-voltage; wherein the new duty cycle D' satisfies: D'=D*A/B; wherein D denotes a duty cycle obtained from a control loop of the motor driving system, A denotes a previous sample signal of the direct current bus voltage, and B denotes a current sample signal of the direct current bus voltage;
 a duty cycle determination module, connected to an output end of the duty cycle calculation module, and configured to determine whether the new duty cycle D' is greater than 100%; and
 an adjustment module, connected to the output end of the duty cycle calculation module and an output end of the duty cycle determination module, and configured to initiate a weak magnetic control when the new duty cycle D' is greater than 100%, and apply the new amplitude to a sine wave generator when the new duty cycle D' is less than or equal to 100%, so as to adjust a duty cycle of PWM signals through the new amplitude.

Optionally, the sampling module comprises analog-to-digital converters.

Optionally, the duty cycle calculation module comprises a divider circuit and a multiplier circuit; wherein the divider circuit divides the previous sample signal of the direct current bus voltage by the current sample signal of the direct current bus voltage to obtain a ratio, and the multiplier circuit multiplies the ratio with the duty cycle fed back by the control loop of the motor driving system to obtain the new duty cycle.

Optionally, the circuit further comprises an under-voltage protection module connected to the output end of the under-voltage determination module.

To achieve the above and other related purposes, the present application provides a motor driving system, comprising:

a rectifier, an inverter, a motor, and a controller; wherein the rectifier receives a power grid voltage and rectifies the power grid voltage into a direct current bus voltage;

the inverter is connected to an output end of the rectifier, and configured to convert the direct current bus voltage into a motor driving signal through the controller;

the motor is connected to an output end of the inverter, and configured to rotate based on the motor driving signal;

the controller obtains a motor sampling signal and the direct current bus voltage, and generates PWM signals for controlling the inverter;

wherein the controller comprises a control loop signal processing unit, a sine wave generator, a PWM generator, and the circuit for adaptively adjusting the PWM duty cycle mentioned above;

the control loop signal processing unit generates a control loop output signal based on the motor sampling signal;

the circuit generates an adjustment signal based on fluctuations of the direct current bus voltage;

the sine wave generator is connected to an output end of the control loop signal processing unit and an output end of the circuit, and configured to generate a carrier based on the control loop output signal, and adjust an amplitude or phase of the carrier by controlling the circuit;

the PWM generator is connected to an output end of the sine wave generator, and configured to generate PWM signals based on the carrier.

Optionally, the sine wave generator generates a sine wave, saddle wave, or square wave.

Optionally, the motor sampling signal comprises a current sampling signal, torque sampling signal, or speed sampling signal.

As describe above, the method, circuit, and motor driving system of the present application have the following beneficial effects.

Without altering the core current loop, torque loop, or speed loop of the motor driving system, this application adaptively adjusts the PWM duty cycle based on existing sine wave generators and PWM generators. This approach effectively mitigates the impact of direct current bus voltage fluctuations on motor performance. Importantly, it achieves these benefits without extra requirement on CPU performance, ensuring straightforward operation, and significantly reducing costs.

REFERENCE NUMERALS

Figure 1:
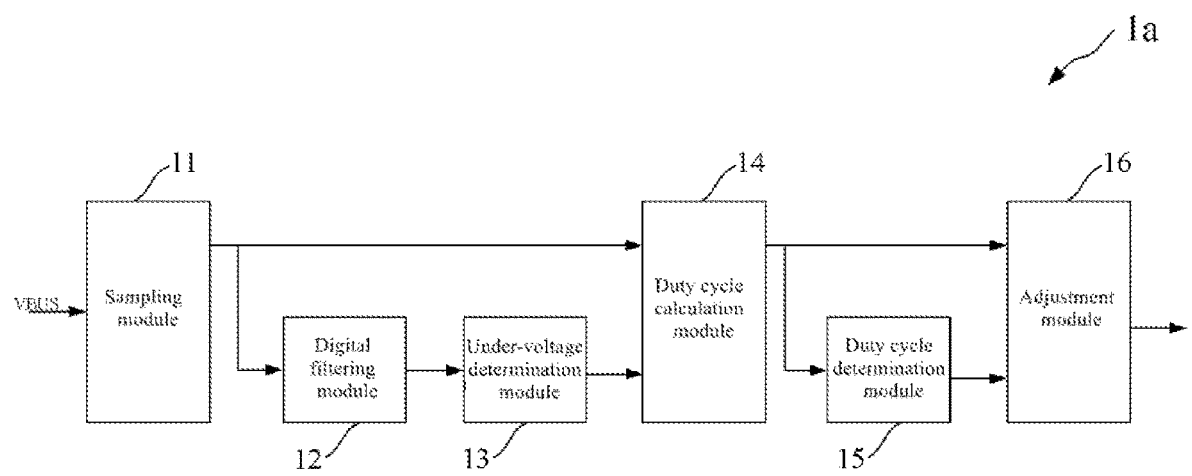
FIG. 1 shows a schematic structural diagram of a circuit for adaptively adjusting a PWM duty cycle according to the present application.

1 Controller
1*a* Circuit for adaptively adjusting a PWM duty cycle
11 Sampling module
12 Digital filtering module
13 Under-voltage determination module
14 Duty cycle calculation module
14*a* Divider circuit
14*b* Multiplier circuit
15 Duty cycle determination module
16 Adjustment module
1*b* Control loop signal processing unit
1*c* Sine wave generator
1*d* PWM generator
1*e* Sensor interface
2 Rectifier
3 Inverter
4 Motor
5 Sensor

DETAILED DESCRIPTION OF THE INVENTION

The embodiments of the present application will be described below. Those skilled in the art can easily understand other advantages and effects of the present application according to contents disclosed by the specification. The present application may also be implemented or applied through other different specific implementation modes. Various modifications or changes may be made to all details in the specification based on different points of view and applications without departing from the spirit of the present application.

Referring to FIGS. 1 to 4. It should be noted that the drawings provided in this application only illustrate the basic concept of the present application in a schematic way, so the drawings only show the components closely related to the present application. The drawings are not necessarily drawn according to the number, shape, and size of the components in actual implementation; during the actual implementation, the type, quantity, and proportion of each component can be changed as needed, and the components' layout may also be more complicated.

Embodiment 1

As shown in FIG. 1, Embodiment 1 provides a circuit 1*a* for adaptively adjusting a PWM duty cycle, which is used for a motor driving system, comprising:

a sampling module 11, a digital filtering module 12, an under-voltage determination module 13, a duty cycle calculation module 14, a duty cycle determination module 15 and an adjustment module 16.

As shown in FIG. 1, the sampling module 11 receives a direct current bus voltage VBUS and samples the direct current bus voltage VBUS, so as to obtain sample signals of the direct current bus voltage VBUS.

Specifically, when a load changes greatly, the power grid voltage fluctuates, and the input direct current bus voltage VBUS also fluctuates. In Embodiment 1, the sampling module 11 is implemented by an analog-to-digital converter, and corresponding digital signals are generated through an analog-to-digital conversion to obtain fluctuation information of the power grid voltage. The circuit structure of the analog-to-digital converter may be adjusted as needed, which is not limited herein.

As shown in FIG. 1, the digital filtering module 12 is connected to an output end of the sampling module 11, and is configured to perform a low-pass filtering on the sample signals to obtain low-pass filtered signals.

Specifically, by low-pass filtering the sample signals through the digital filtering module 12, an average value of the sample signals within a set time is obtained.

As shown in FIG. 1, the under-voltage determination module 13 is connected to an output end of the digital filtering module 12, and is configured to determine whether the direct current bus voltage VBUS is under-voltage based on the low-pass filtered signals.

Specifically, in Embodiment 1, the under-voltage determination module 13 is implemented by a comparison module, comparing an output voltage of the digital filtering module 12 with a voltage of an under-voltage protection point. When the output voltage of the digital filtering module 12 is less than the voltage of the under-voltage protection point, the under-voltage determination module 13 determines that the direct current bus voltage VBUS is under-voltage. When the output voltage of the digital filtering module 12 is greater than or equal to the voltage of the under-voltage protection point, the under-voltage determination module 13 determines that the direct current bus voltage VBUS is not under-voltage.

As shown in FIG. 1, the duty cycle calculation module 14 is connected to the output end of the sampling module 11 and an output end of the under-voltage determination module 13, and is configured to calculate a new duty cycle D' and a new amplitude corresponding to the new duty cycle D' when the direct current bus voltage VBUS is not under-voltage.

Figure 2:
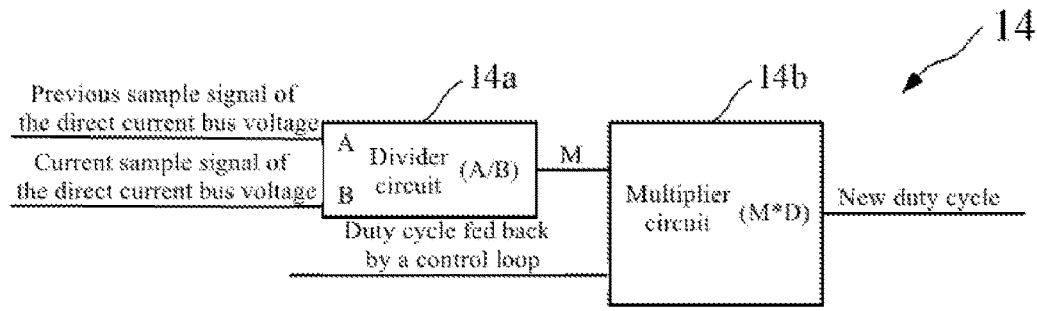
FIG. 2 shows a schematic structural diagram of a duty cycle calculation module according to the present application.

Specifically, as shown in FIG. 2, in Embodiment 1, the duty cycle calculation module 14 comprises a divider circuit 14a and a multiplier circuit 14b. The divider circuit 14a obtains the sample signals from the sampling module 11, and divides a previous sample signal A of the direct current bus voltage VBUS by a current sample signal B of the direct current bus voltage VBUS to obtain a ratio M, where M=A/B. The multiplier circuit 14b obtains a duty cycle D from a control loop of the motor driving system, and multiplies the ratio M with the duty cycle D fed back by the control loop of the motor driving system to obtain the new duty cycle D', where D'=M*D. In application, any circuit structure capable of obtaining a relational expression satisfying D'=D*A/B is applicable to the present application. As an example, the multiplier circuit may be used to multiply the duty cycle D by the previous sample signal A, and then divide by the current sample signal B, which is not limited to Embodiment 1.

It should be noted that the new amplitude corresponds to the new duty cycle D' in a proportional way. As an example, when the new duty cycle D' is 100%, the new amplitude is 1V, and when the new duty cycle is 0%, the new amplitude is 0V. The proportional relationship between the new amplitude and the new duty cycle D' may be adjusted as needed, which is not limited to Embodiment 1.

It should be noted that the control loop of the motor driving system may comprise a current loop, speed loop, and torque loop.

As shown in FIG. 1, the duty cycle determination module 15 is connected to an output end of the duty cycle calculation module 14, and is configured to determine whether the new duty cycle D' is greater than 100%.

Specifically, in Embodiment 1, the duty cycle determination module 15 is implemented by a comparison module, and the duty cycle determination module 15 compares the new duty cycle D' with 100%, and obtains a comparison result.

As shown in FIG. 1, the adjustment module 16 is connected to the output end of the duty cycle calculation module 14 and an output end of the duty cycle determination module 15, and is configured to initiate a weak magnetic control when the new duty cycle D' is greater than 100%, and apply the new amplitude to a sine wave generator when the new duty cycle D' is less than or equal to 100%, so as to adjust a duty cycle of PWM signals through the new amplitude.

Specifically, in Embodiment 1, when the new duty cycle D' is greater than 100%, the adjustment module 16 first outputs an adjustment signal to adjust an amplitude of a carrier to a maximum value (that is, the corresponding duty cycle is 100%, and when the new duty cycle D' is 100%, the step of adjusting the amplitude may be omitted), and to adjust a phase of the carrier to change phases of the PWM signals, thereby changing a lead angle of the motor. As an example, the phases of the PWM signals are adjusted forward to achieve the weak magnetic control.

Specifically, when the new duty cycle D' is less than or equal to 100%, the adjustment module 16 applies the new amplitude output by the duty cycle calculation module 14 to the sine wave generator, so as to adjust the duty cycle of the PWM signals through the new amplitude, and the phases of the PWM signals remain unchanged.

In another example, the circuit 1a further comprises an under-voltage protection module (not shown). The under-voltage protection module is connected to the output end of the under-voltage determination module 13, and turns off power devices when the direct current bus voltage is under-voltage, implementing under-voltage protection. As an example, a gate of each power device may be pulled down by turning on a pull-down path to turn off each power device.

Embodiment 2

Figure 3:
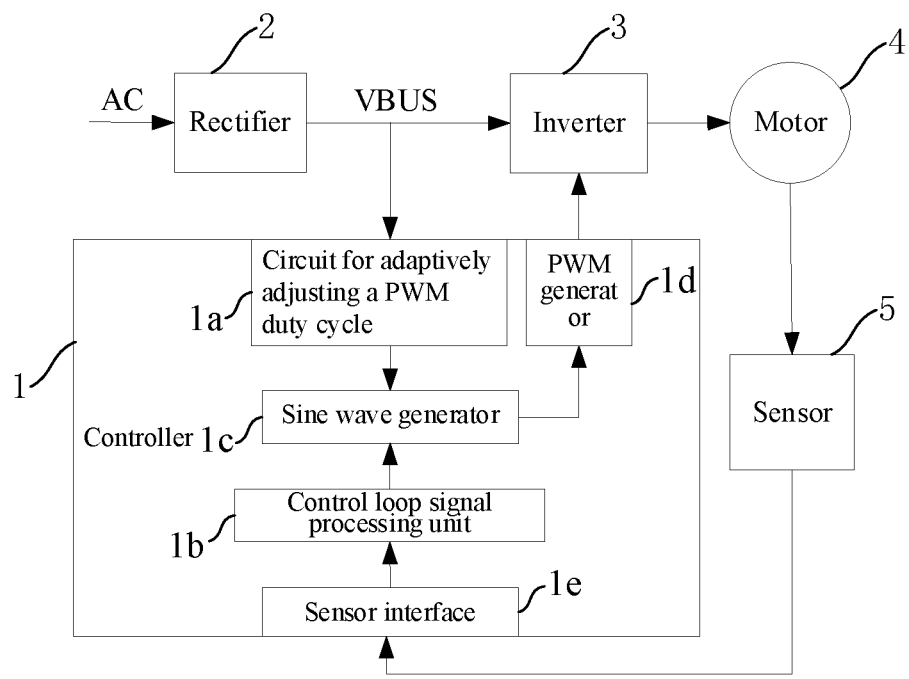
FIG. 3 shows a schematic structural diagram of a motor driving system according to the present application.

As shown in FIG. 3, Embodiment 2 provides a motor driving system, comprising:

a controller 1, a rectifier 2, an inverter 3, and a motor 4.

As shown in FIG. 3, the rectifier 2 receives a power grid voltage AC and rectifies the power grid voltage AC into a direct current bus voltage.

Specifically, the rectifier 2 may be a rectifier bridge structure, and any circuit structure capable of converting an alternating current voltage into a direct current voltage is applicable to the present application.

It should be noted that the rectifier 2 further comprises a power conversion unit for power conversion. The power conversion unit may comprise a boost circuit and a buck circuit, and any circuit structure capable of implementing power conversion and obtaining desired voltage signals is applicable to the present application.

As shown in FIG. 3, the inverter 3 is connected to an output end of the rectifier 2, and is configured to convert the direct current bus voltage VBUS into a motor driving signal through the controller 1.

Specifically, any circuit structure capable of converting the direct current bus voltage VBUS into an alternating current voltage to drive the motor 4 is applicable to the present application.

As shown in FIG. 3, the motor 4 is connected to an output end of the inverter 3, and is configured to rotate based on the motor driving signal.

Specifically, in Embodiment 2, the motor 4 is a three-phase motor. In application, the motor may be set according to actual needs.

As shown in FIG. 3, the controller 1 obtains a motor sampling signal and the direct current bus voltage, and generates PWM signals for controlling the inverter.

As an example, the motor driving system further comprises a sensor 5. The sensor 5 is configured to collect the motor sampling signal, including but not limited to a current sampling signal, speed sampling signal, or torque sampling signal of the motor 4. In practice, some torque can be controlled without feedback from the torque sampling signal when the duty cycle is considered to be the torque.

Specifically, the controller 1 obtains the motor sampling signal from the motor 4, and generates a feedback control signal based on a difference value between the motor sampling signal and a reference signal. The controller 1 comprises the circuit 1a, a control loop signal processing unit 1b, a sine wave generator 1c, and a PWM generator 1d. As an example, the controller 1 further comprises a sensor interface 1e for acquiring an output signal of the sensor 5.

More specifically, as shown in FIG. 3, the control loop signal processing unit 1b generates a control loop output signal based on the motor sampling signal.

More specifically, as shown in FIG. 3, the circuit 1a generates an adjustment signal based on fluctuations of the direct current bus voltage VBUS, so as to adjust an amplitude and/or phase of the sine wave generator 1c.

More specifically, as shown in FIG. 3, the sine wave generator 1c is connected to an output end of the control loop signal processing unit 1b and an output end of the circuit 1a, and is configured to generate a carrier based on the control loop output signal, and adjust an amplitude or phase of the carrier by controlling the circuit 1a. Input signals of the sine wave generator 1c comprise amplitudes and phases, so as to generate a carrier with a corresponding amplitude and phase. The carrier generated by the sine wave generator 1c may be adjusted with parameters to obtain a corresponding sine wave, saddle wave, or square wave. The sine wave generator 1c generates a carrier based on the control loop output signal, and generates the PWM signals based on the carrier, so as to control the inverter 3. In addition, the sine wave generator 1c further adjusts the amplitude and/or phase of the carrier by controlling the circuit 1a, thereby controlling the inverter 3. The adjustment path and the control loop are independent of each other, and therefore the control loop does not need to be changed, ensuring straightforward operation, and significantly reducing costs.

More specifically, as shown in FIG. 3, the PWM generator 1d is connected to an output end of the sine wave generator 1c, and is configured to generate the PWM signals based on the carrier.

Specifically, the amplitude of the carrier determines the duty cycle of the PWM signals output by the PWM generator 1d, and the phase of the carrier determines whether the PWM signals have a lead output or a hysteresis output. The PWM signals are square wave signals whose amplitudes are the same, whose duty cycles are related to the amplitude of the carrier, and whose phases are related to that of the carrier. The PWM signals are used for controlling the power devices in the inverter 3.

It should be noted that, in Embodiment 2, the inverter 3, the motor 4, the sensor 5, the control loop signal processing unit 1b, the sine wave generator 1c, and the PWM generator 1d constitute the control loop. The present application builds upon existing control loops by incorporating additional multiplication and division operations (implemented within the circuit for adaptively adjusting the PWM duty cycle). This enables rapid updates and/or phase adjustments of the PWM duty cycle based on variations in the direct current bus voltage, mitigating the impact of voltage fluctuations on the motor. Importantly, these modifications do not affect previously fine-tuned parameters of any existing speed loop, current loop, or torque loop. Instead, they directly modify the sine wave generator and PWM generator, resulting in a straightforward and cost-effective solution.

Embodiment 3

Figure 4:
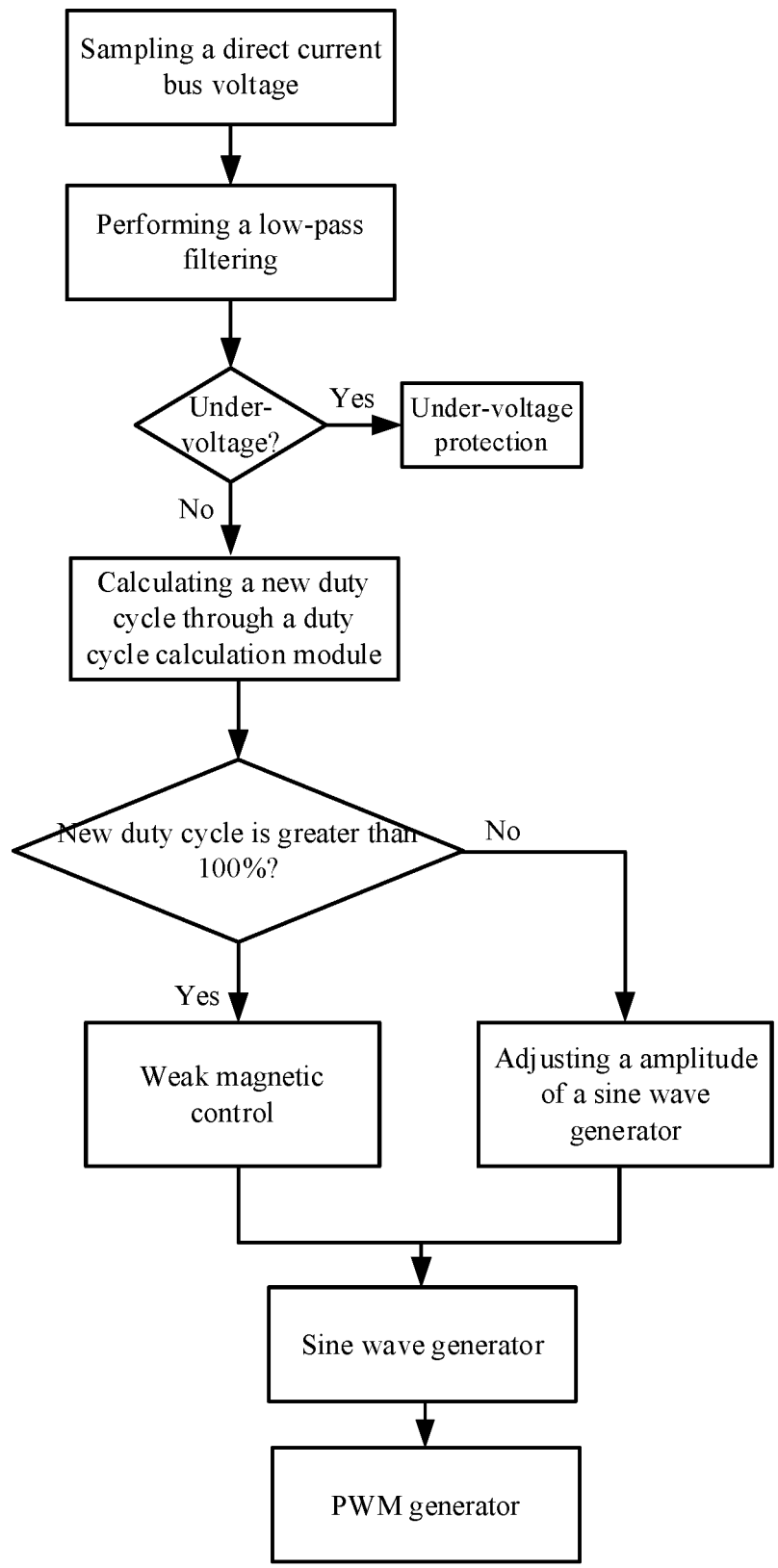
FIG. 4 shows a flowchart of a method for adaptively adjusting the PWM duty cycle according to the present application.

As shown in FIG. 4, Embodiment 3 provides a method for adaptively adjusting a PWM duty cycle, which may be implemented based on the circuit according to Embodiment 1. Any hardware or software capable of implementing this method is applicable to the present application. The method for adaptively adjusting the PWM duty cycle comprises:

1) sampling a direct current bus voltage to obtain sample signals of the direct current bus voltage, and performing a low-pass filtering on the sample signals to obtain low-pass filtered signals.

Specifically, when the power grid voltage fluctuates, the direct current bus voltage also fluctuates, and the fluctuation information of the power grid voltage is obtained by sampling the direct current bus voltage. In Embodiment 3, the sampling of the direct current bus voltage is implemented in an analog-to-digital conversion manner, and in application, any sampling manner capable of sampling the direct current bus voltage is applicable to the present application. Digital low-pass filtering is performed on the sample signals to obtain an average value of the sample signals within a set time.

2) determining whether the direct current bus voltage is under-voltage based on the low-pass filtered signals; if yes, entering an under-voltage protection state; and if not, executing step 3).

Specifically, a low-pass filtered voltage is compared with a voltage of an under-voltage protection point to determine whether the direct current bus voltage is under-voltage. As an example, if the direct current bus voltage is under-voltage, an under-voltage protection is initiated by turning off all power devices (including but not limited to a power switch transistor in the inverter 3). If the direct current bus voltage is not under-voltage, the step 3) is performed.

3) dividing a previous sample signal of the direct current bus voltage by a current sample signal of the direct current bus voltage to obtain a ratio, and multiplying the ratio with a duty cycle fed back by a control loop of the motor driving system to obtain a new duty cycle D' and a new amplitude corresponding to the new duty cycle D'.

Specifically, the new duty cycle D' can be calculated by a relationship $D'=D*A/B$, where D denotes the duty cycle obtained from the control loop of the motor driving system, A denotes the previous sample signal of the direct current bus voltage, and B denotes the current sample signal of the direct current bus voltage. As an example, the above relationship may be implemented by a multiplier circuit and a divider circuit.

It should be noted that the control loop may comprise a current loop, torque loop, or speed loop, and the duty cycle fed back by the control loop is adjusted as a reference to obtain the new duty cycle.

Specifically, the new amplitude corresponds to the new duty cycle D' in a proportional way. In application, the proportional relationship between the new amplitude and the new duty cycle D' may be adjusted as needed, which is not limited to Embodiment 3.

4) determining whether the new duty cycle D' is greater than 100%; if yes, applying a weak magnetic control; and if not, setting an amplitude of a carrier for generating PWM signals as the new amplitude, so as to adjust a duty cycle of the PWM signals through the new amplitude.

Specifically, the new duty cycle D' is compared with 100% to obtain a comparison result. When the new duty cycle D' is greater than 100%, the weak magnetic control is initiated to output an adjustment signal, so as to adjust the amplitude of the carrier to a maximum value. Then a phase of the carrier is adjusted to change phases of the PWM signals, thereby changing a lead angle of the motor, and achieving weak magnetic control. As an example, the phases of the PWM signals are adjusted forward to achieve the weak magnetic control. When the new duty cycle D' is less than or equal to 100%, the new amplitude is applied to the carrier, so as to adjust the duty cycle of the PWM signals through the new amplitude, and the phases of the PWM signals remain unchanged. As an example, the carrier comprises a sine wave, saddle wave, or square wave.

The present application employs AD modules to monitor external voltage changes. Based on the voltage fluctuations, it categorizes the current direct current bus voltage state. When the voltage variation is minimal, it adjusts the PWM generator's duty cycle by modifying the sine wave generator's amplitude. In cases of significant voltage fluctuations, it fine-tunes both the duty cycle and phase of the PWM generator by adjusting the sine wave generator's amplitude and phase. If the voltage variation becomes excessive, an under-voltage protection is activated. This approach adaptively adjusts the duty cycle of the PWM signals.

In summary, the present application provides a method, circuit, and motor driving system for adaptively adjusting the PWM duty cycle, comprising: 1) sampling a direct current bus voltage to obtain sample signals of the direct current bus voltage, and performing a low-pass filtering on the sample signals to obtain low-pass filtered signals; 2) determining whether the direct current bus voltage is under-voltage based on the low-pass filtered signals; if yes, entering an under-voltage protection state; and if not, executing step 3); 3) calculating a new duty cycle D' and a new amplitude corresponding to the new duty cycle D', wherein the new duty cycle D' satisfies: D'=D*A/B, wherein D denotes a duty cycle obtained from a control loop of the motor driving system, A denotes a previous sample signal of the direct current bus voltage, and B denotes a current sample signal of the direct current bus voltage; 4) determining whether the new duty cycle D' is greater than 100%; if yes, applying a weak magnetic control; and if not, setting an amplitude of a carrier for generating PWM signals as the new amplitude, so as to adjust a duty cycle of the PWM signals through the new amplitude. Without altering the core current loop, torque loop, or speed loop of the motor driving system, this application adaptively adjusts the PWM duty cycle based on existing sine wave generators and PWM generators. This approach effectively mitigates the impact of direct current bus voltage fluctuations on motor performance. Importantly, it achieves these benefits without extra requirement on CPU performance, ensuring straightforward operation, and significantly reducing costs. Therefore, the present disclosure effectively overcomes various shortcomings in the related technology and has high industrial utilization value.

The above-mentioned embodiments are for exemplarily describing the principle and effects of the present disclosure instead of limiting the present disclosure. Those skilled in the art can make modifications or changes to the above-mentioned embodiments without going against the spirit and the range of the present disclosure. Therefore, all equivalent modifications or changes made by those who have common knowledge in the art without departing from the spirit and technical concept disclosed by the present disclosure shall be still covered by the scope of the present disclosure.

The invention claimed is:

1. A method for adaptively adjusting a PWM duty cycle, for a motor driving system, comprising:
   sampling a direct current bus voltage to obtain sample signals of the direct current bus voltage, and performing a low-pass filtering on the sample signals to obtain low-pass filtered signals;
   upon determining the direct current bus voltage is under-voltage based on the low-pass filtered signals, entering an under-voltage protection state;
   upon determining the direct current bus voltage is not under-voltage based on the low-pass filtered signals, calculating a new duty cycle D' and a new amplitude corresponding to the new duty cycle D', wherein the new duty cycle D' satisfies: D'=D*A/B, wherein D denotes a duty cycle obtained from a control loop of the motor driving system, A denotes a previous sample signal of the direct current bus voltage, and B denotes a current sample signal of the direct current bus voltage;
   upon determining the new duty cycle D' is greater than 100%, applying a weak magnetic control;
   upon determining the new duty cycle D' is equal to or less than 100%, setting an amplitude of a carrier for generating PWM signals as the new amplitude, so as to adjust a duty cycle of the PWM signals through the new amplitude.

2. The method according to claim 1, wherein power devices are turned off when the direct current bus voltage is under-voltage.

3. The method according to claim 1, wherein during the weak magnetic control, the amplitude of the carrier is first set to a maximum value, and then phases of the PWM signals are changed by adjusting a phase of the carrier.

4. The method according to claim 1, wherein the control loop comprises a current loop, torque loop, or speed loop.

5. The method according to claim 1, wherein the carrier comprises a sine wave, saddle wave, or square wave.

6. A circuit for adaptively adjusting a PWM duty cycle, for a motor driving system, comprising:
   a sampling module, configured to receive a direct current bus voltage and sample the direct current bus voltage, so as to obtain sample signals of the direct current bus voltage;
   a digital filtering module, connected to an output end of the sampling module, and configured to perform a low-pass filtering on the sample signals to obtain low-pass filtered signals;
   an under-voltage determination module, connected to an output end of the digital filtering module, and configured to determine whether the direct current bus voltage is under-voltage based on the low-pass filtered signals;
   a duty cycle calculation module, connected to the output end of the sampling module and an output end of the under-voltage determination module, and configured to calculate a new duty cycle D' and a new amplitude corresponding to the new duty cycle D' when the direct current bus voltage is not under-voltage; wherein the new duty cycle D' satisfies: D'=D*A/B; wherein D denotes a duty cycle obtained from a control loop of the motor driving system, A denotes a previous sample signal of the direct current bus voltage, and B denotes a current sample signal of the direct current bus voltage;

a duty cycle determination module, connected to an output end of the duty cycle calculation module, and configured to determine whether the new duty cycle D' is greater than 100%; and an adjustment module, connected to the output end of the duty cycle calculation module and an output end of the duty cycle determination module, and configured to initiate a weak magnetic control when the new duty cycle D' is greater than 100%, and apply the new amplitude to a sine wave generator when the new duty cycle D' is less than or equal to 100%, so as to adjust a duty cycle of PWM signals through the new amplitude.

7. The circuit according to claim 6, wherein the sampling module comprises analog-to-digital converters.

8. The circuit according to claim 6, wherein the under-voltage determination module comprises comparison modules.

9. The circuit according to claim 6, wherein the duty cycle calculation module comprises a divider circuit and a multiplier circuit; wherein the divider circuit divides the previous sample signal of the direct current bus voltage by the current sample signal of the direct current bus voltage to obtain a ratio, and the multiplier circuit multiplies the ratio with the duty cycle fed back by the control loop of the motor driving system to obtain the new duty cycle.

10. The circuit according to claim 6, wherein the control loop comprises a current loop, torque loop, or speed loop.

11. The circuit according to claim 6, further comprising an under-voltage protection module, wherein the under-voltage protection module is connected to the output end of the under-voltage determination module.

12. A motor driving system, comprising:

a rectifier, an inverter, a motor, and a controller; wherein the rectifier receives a power grid voltage and rectifies the power grid voltage into a direct current bus voltage;

the inverter is connected to an output end of the rectifier, and configured to convert the direct current bus voltage into a motor driving signal through the controller;

the motor is connected to an output end of the inverter, and configured to rotate based on the motor driving signal;

the controller obtains a motor sampling signal and the direct current bus voltage, and generates PWM signals for controlling the inverter;

wherein the controller comprises a control loop signal processing unit, a sine wave generator, a PWM generator, and the circuit for adaptively adjusting the PWM duty cycle according to claim 6;

the control loop signal processing unit generates a control loop output signal based on the motor sampling signal;

the circuit generates an adjustment signal based on fluctuations of the direct current bus voltage;

the sine wave generator is connected to an output end of the control loop signal processing unit and an output end of the circuit, and configured to generate a carrier based on the control loop output signal, and adjust an amplitude or phase of the carrier by controlling the circuit;

the PWM generator is connected to an output end of the sine wave generator, and configured to generate PWM signals based on the carrier.

13. The motor driving system according to claim 12, wherein the motor sampling signal comprises a current sampling signal, torque sampling signal, or speed sampling signal.

14. The motor driving system according to claim 12, wherein the motor driving system further comprises a sensor.

15. The motor driving system according to claim 14, wherein the controller further comprises a sensor interface for acquiring an output signal of the sensor.

* * * * *